Jan. 12, 1954    B. A. KRENOV    2,665,454
BATHROOM UNIT
Filed March 28, 1950    9 Sheets-Sheet 2

INVENTOR
Boris A. Krenov
BY
Pennie, Edmonds, Morton and Barrows
ATTORNEYS

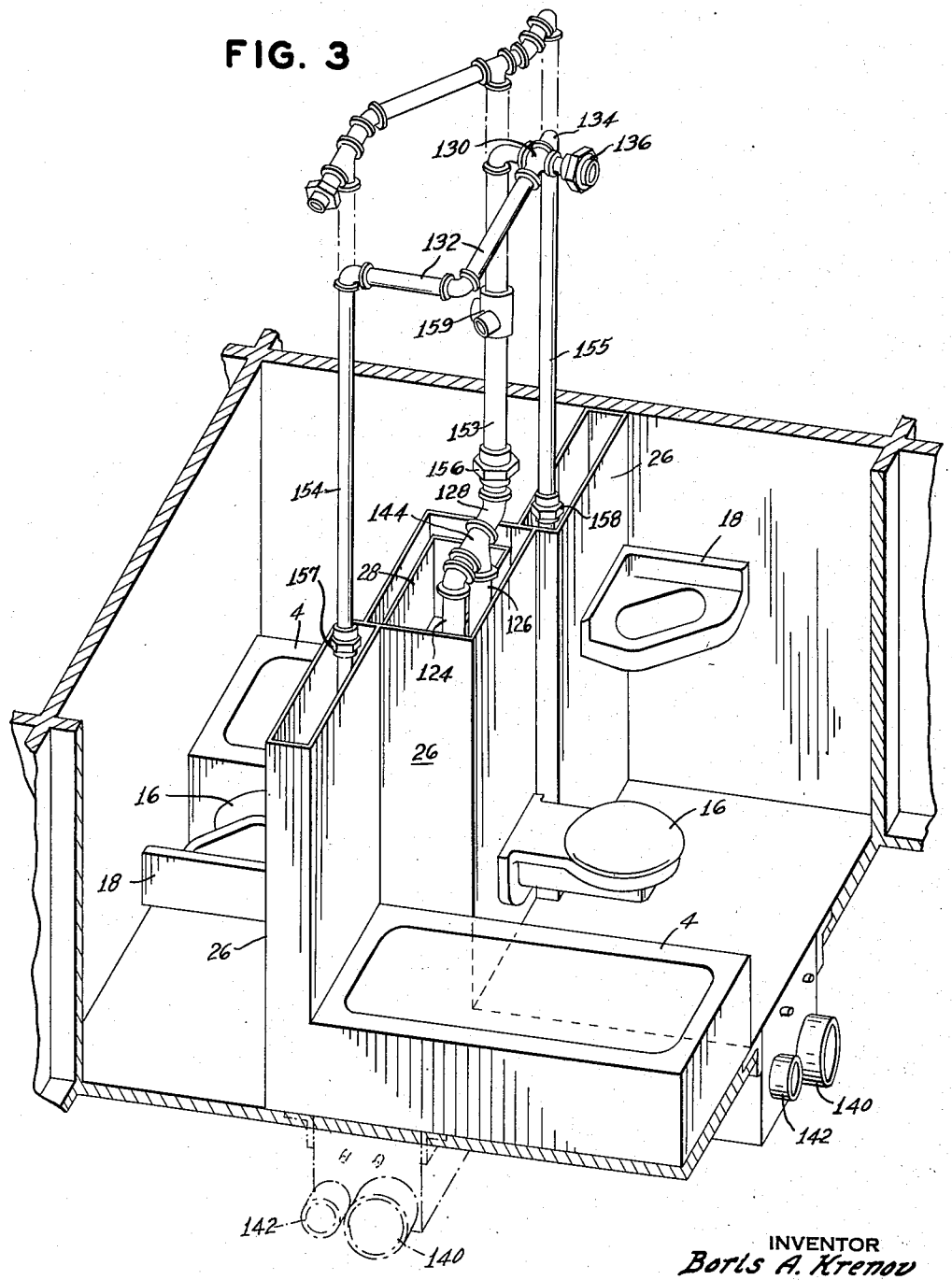

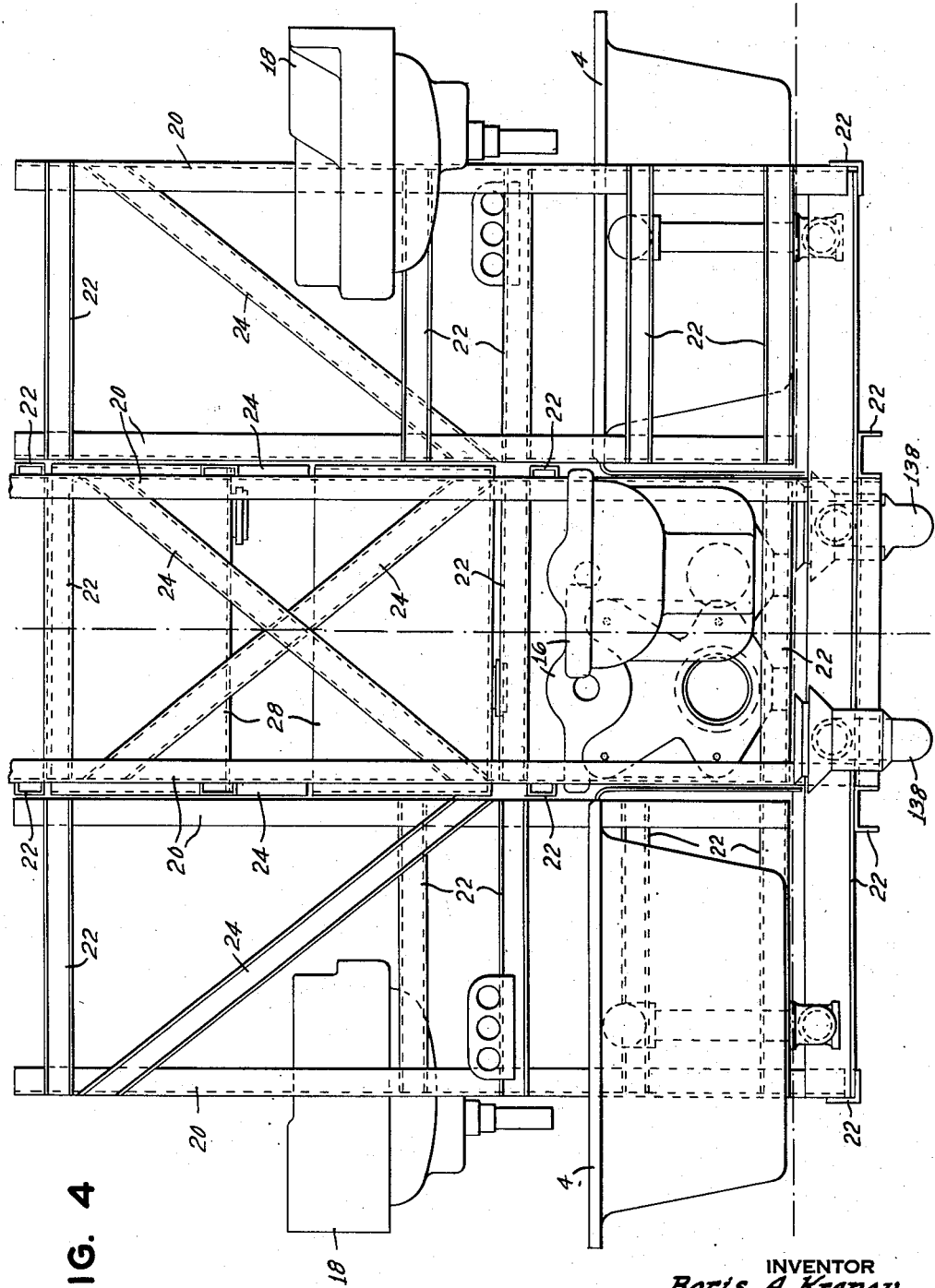

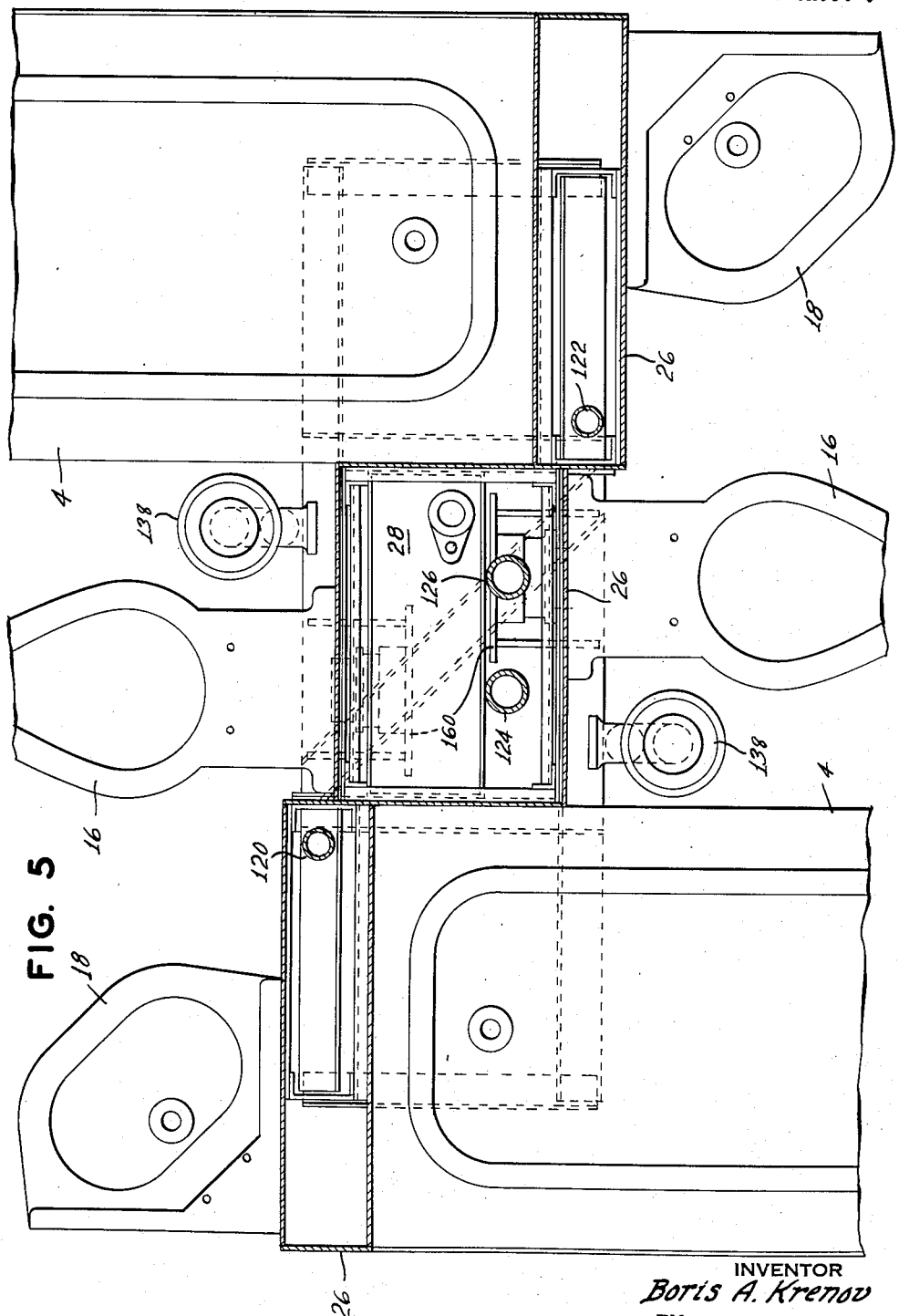

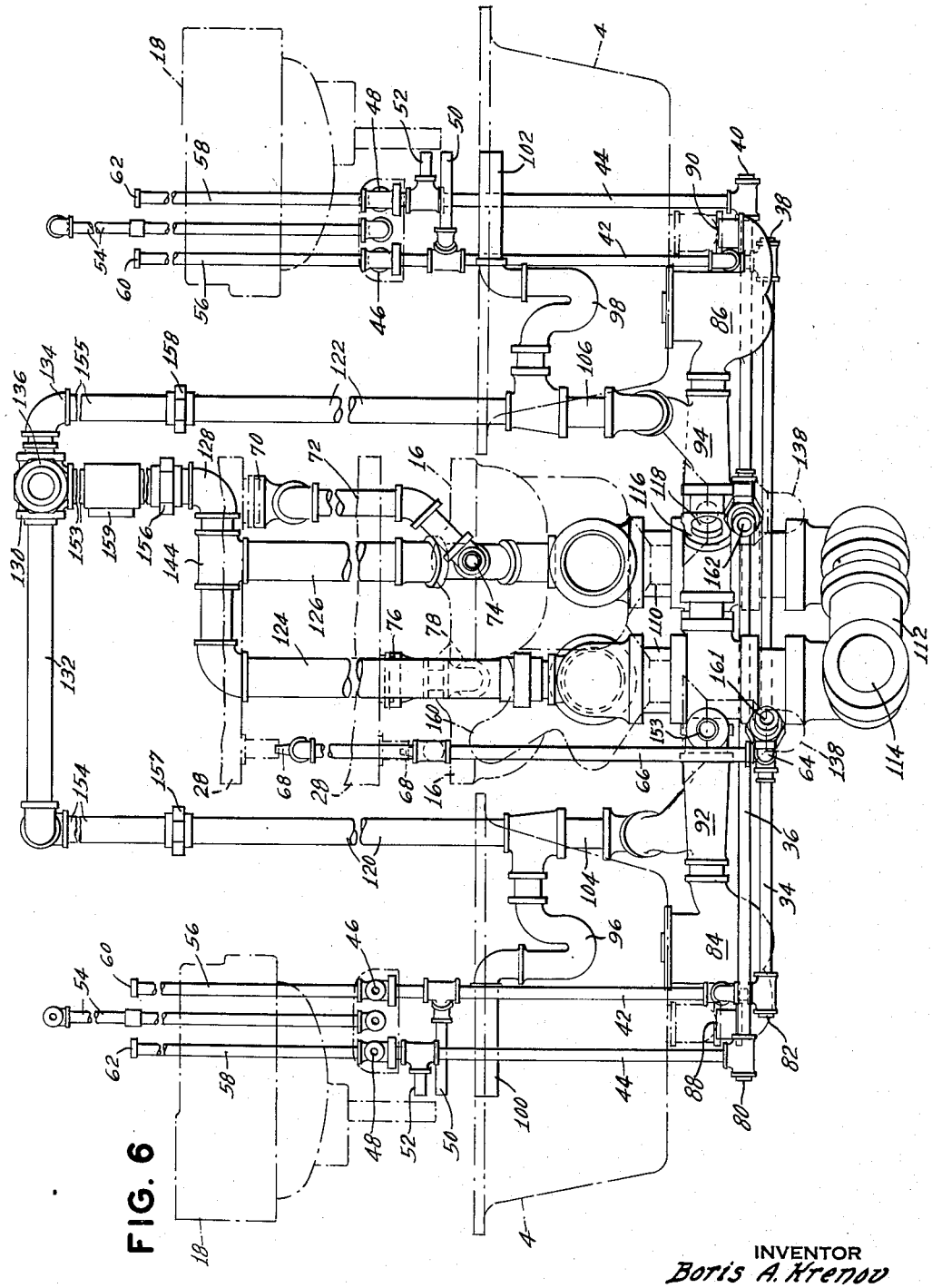

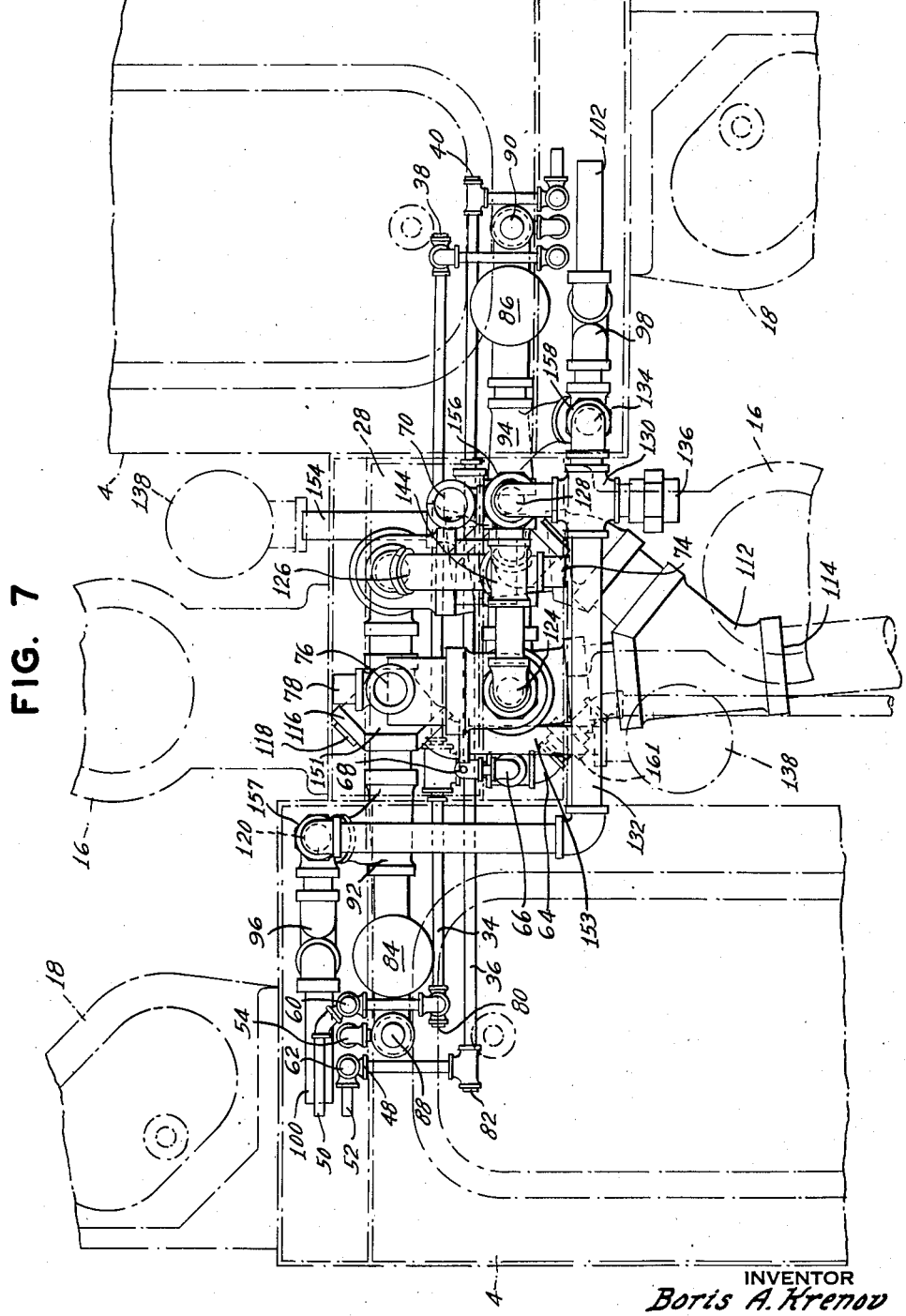

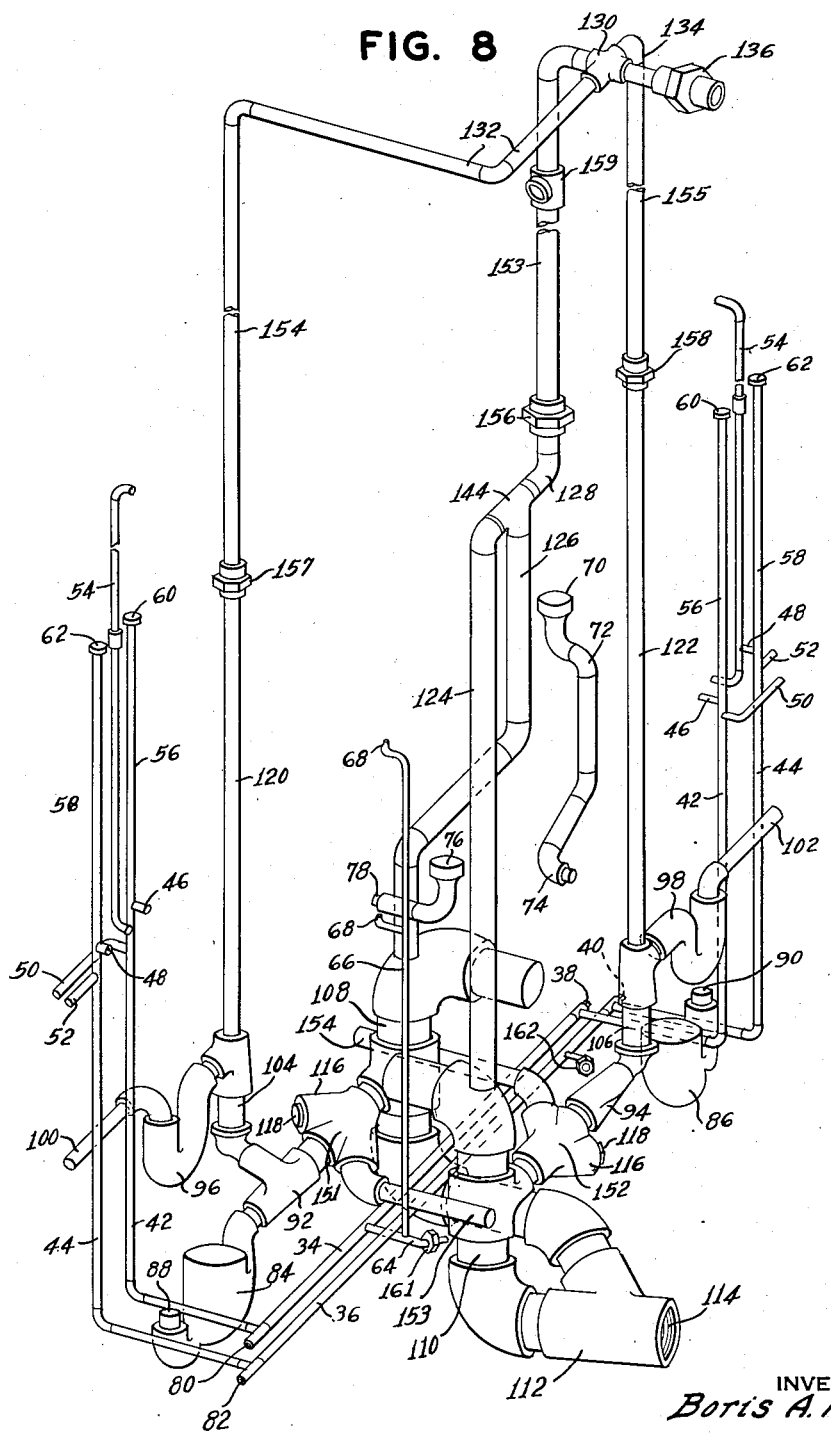

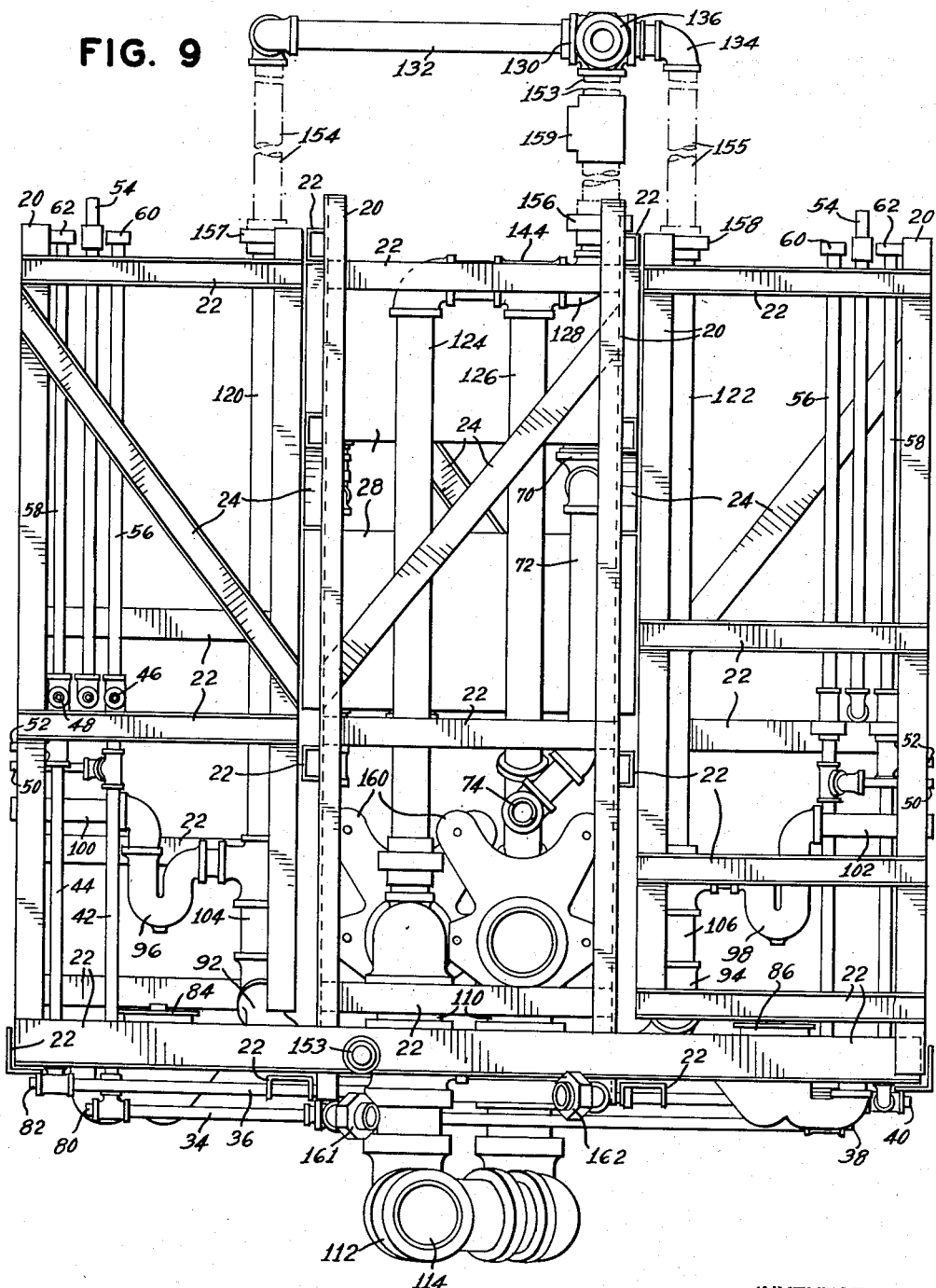

Patented Jan. 12, 1954

2,665,454

UNITED STATES PATENT OFFICE 2,665,454

BATHROOM UNIT

Boris A. Krenov, Seattle, Wash.

Application March 28, 1950, Serial No. 152,363

2 Claims. (Cl. 20—1.11)

This invention relates to bathroom units and more particularly to a duplex bath room unit for use in apartments, hotels and the like.

In such buildings, bath rooms are frequently arranged in pairs with the plumbing connections placed in the dividing wall between the two rooms. This results in economies in piping, plumbing connections and the like. However, the length of each room is not less than the size of the tub and the two rooms have an overall length not less than twice the size of the tub plus the thickness of the dividing wall.

My invention contemplates a duplex bath room lay-out in which the partition wall is staggered and the inner end of the tub in each room is set inwardly or recessed from the other fixtures thereby reducing the overall dimension by the amount of the offset in the wall.

A further feature of the invention is the provision of a pre-fabricated unit consisting of a section of the partition wall and all necessary piping for water supply, drainage and vents mounted in the wall to be connected to the conventional fixtures including the tubs, toilet bowls and basins and also floor drains. The cage or unit, while large enough to hold all of the plumbing, is small enough to be transported as a unit.

A further feature of the invention is the offsetting of toilet bowl and the parallel placement of the toilet pipes, connections and supporting flanges thus recessing the toilet bowls into the center section of the partition. Such recessing pushes the bowls back out of the way of the basin and thus increases standing space in front of the basins, and reduces the thickness of the wall.

A further feature of the invention resides in placing the toilet flush tanks within the cage forming the wall or partition, thus increasing the available space in the bathroom.

By pre-fabricating the plumbing conections, savings both in cost of material and labor are effected. The concealed piping and flush tanks may be made of inexpensive materials such as galvanized iron tanks, cast iron traps, etc. Furthermore, the number of soil stacks necessary in a building structure having a number of bathrooms may be reduced.

In the accompanying drawings I have shown one embodiment of the invention. In this showing:

Fig. 3 is a perspective view showing the cage with the facing material forming the walls in place and with the toilet fixtures in place and also showing alternate pipe connections which may be used;

Fig. 4 is an elevation of the cage with the walls or facings removed and showing the bath room fixtures in place;

Fig. 5 is a plan view of the structure shown in Fig. 4 with the outer walls or facings in position, parts being shown in section;

Fig. 6 is an elevation showing the piping and connections and showing the fixtures in dotted lines;

Fig. 7 is a plan view of the parts shown in Fig. 6;

Fig. 8 is a diagrammatic view of the piping; and

Fig. 9 is a general elevation view of the cage with plumbing but without the fixtures and finished wall surfaces.

Figure 1:
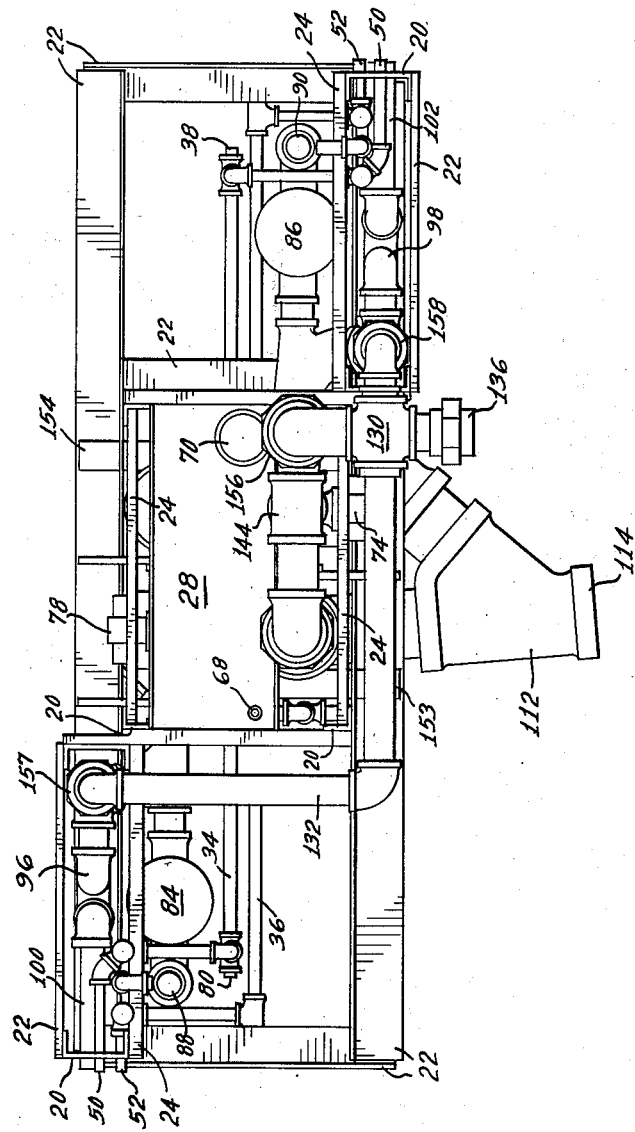
Fig. 1 is a general plan view of the cage with plumbing but without the fixtures and the finished wall surfaces.
Figure 2:
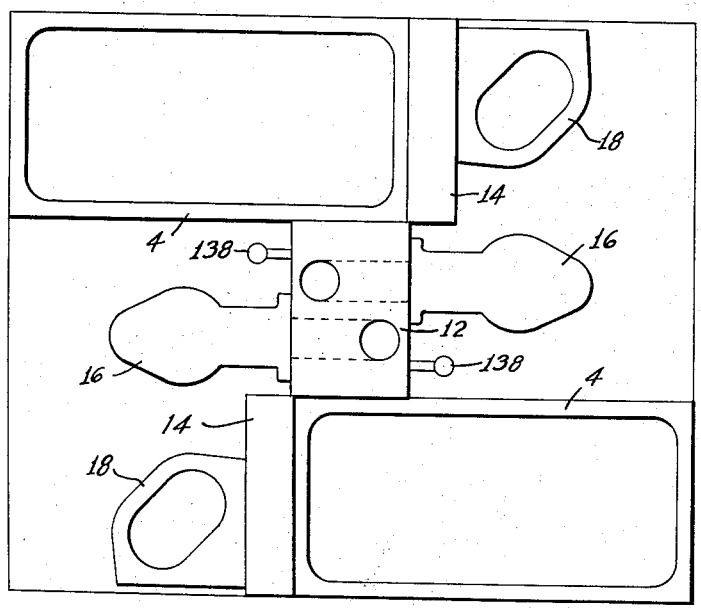
Fig. 2 is a plan view of the twin bathrooms of the present invention.

In Fig. 2 of the drawings bath tubs 4 of the same size as the bath tubs normally used in hotels, apartment houses, etc., are employed. The tubs, however, as shown, are placed on the opposite sides of the two rooms and the two rooms are separated by a partition consisting of staggered sections including a center section 12 and side sections 14. Thus, in the room to the right, the head end of the bath tub is recessed into a portion of the other room and likewise in the bathroom to the left, the tub is recessed in the section 14 of the wall or partition offset from the center section 12, thus reducing the overall size of the two rooms. Toilet bowls 16 are arranged in each of the bathrooms supported by the center section 12 of the partition. The toilet bowls, being offset, reduce the thickness of the center section 12 as compared to the thickness of the dividing wall in Fig. 1. The lavatory basins 18 are supported by the partition sections 14 and are arranged in that portion of each bathroom in alignment with the tub of the adjoining bathroom. These basins are preferably of the corner type, as shown, to provide more floor space.

This drawing also shows the floor drains 138 which are incorporated in the unit, the merit of which is self-explanatory.

Referring to Fig. 4 of the drawings, the cage or unit forming the three partition sections 12 and 14 consist of vertical members 20, horizontal members 22 and diagonal members 24. The supporting members may be channel irons, I-beams or any of the various structural forms used in similar constructions. The cage or unit is constructed and shaped as shown in Fig. 3 of the drawings and suitable facings of sheet metal, wall board or other suitable material are applied when the cage or unit is placed in position and the various connections made. Such facings are shown at 26 (see Figs. 3 and 5). The tubs and floor drains 138 are attached to the unit after the unit has been placed in position and before the facings or finished wall surfaces 26 are secured to the cage. The toilet bowls 16 and basins 18 are hung after the finished wall surfaces 26 are secured to the cage. The height of the unit is approximately six feet, extending about four feet above the floor level and two feet below the floor level. It thus extends through the thickness of the floor. As ceilings are of varying height, the remainder of the space above the cage or unit may be built in to complete the rest of the wall of the room. As shown in Figs. 9 and 10 of the drawings, the various water supply pipes, drainage pipes, vents, etc. are assembled in the cage and shipped as a unit. After the cage is placed in position in the room, the necessary connections of the tubs, toilet bowls, lavatory basins, floor drains, etc. are made to the cage. As shown in Figs. 4, 5, 9 and 10, a pair of flush tanks 28 are incorporated one above the other in the center section 12 of the partition and connected, as will be hereinafter described, to the source of cold water supply and to the toilets 16. The center portion 12 of the partition is of greater width or thickness than the offset end portions 14. The width or thickness of this center portion 12 is just sufficient to accommodate the bulky four inch soil pipes with their connections and the cumbersome toilet bowl supporting flanges 160. Yet this center portion 12 is sufficiently wide to accommodate the flush tanks 28 and the two inch vent pipes. It is advantageous to have the sections 14 of the least possible thickness so as to afford greater standing space in the bathrooms; therefore, they are just thick enough to hold or accommodate the one and one-half inch P-traps 96 and 98 of the basins and the water supply pipes and one and one-half inch vent pipes. The toilets have been arranged offset one from the other in order to accommodate all their necessary pipes and connections within the thickness of center section 12; while at the same time center section 12 has been kept to the minimum size in order that the maximum standing space be available.

The supply pipes, vents and drainage pipes are shown diagrammatically in Fig. 8 of the drawings with the frame of the cage omitted for the purpose of clarity of presentation and it is believed that the complete structure will be better understood by reference to that figure first. Thus, I provide a pair of water supply pipes 34 and 36 which may be connected to the house supply pipes by union joints 161 and 162 or 38 and 40. The ends of these pipes are connected to vertical pipes 42 and 44. The pipes 42 and 44 are provided with branches 46 and 48 to be connected to the valve assembly of the tub 4 in each bathroom and with similar branches 50 and 52 to be connected to the valves of the lavatory basin 18 in each bathroom. Pipes 54 are also arranged in the cage to be connected to a shower head arranged over the tub 4. Also two pipe lengths 56 and 58 are provided, which are closed by caps 60 and 62, and act as anti-knock compression chambers. All three pipes 54, 56 and 58 are interconnected with the supply pipes 42 and 44 by means and within the usual bath tub spout and mixing valve assembly (not shown on the drawings).

The cold water supply pipe 34 is provided with a branch 64 connected to a vertical pipe 66 and this pipe has two connections 68 arranged at different elevations to be connected to the flush tanks 28. The upper flush tank is connected to an outlet 70 to which suitable piping 72 is connected leading to a horizontal arm 74 adapted to be connected to the toilet bowl 16 on one side of the partition. As the other flush tank is arranged at a lower level, its outlet 76 is directly connected to horizontal piping 78 which leads to the toilet bowl on the other side of the partition. The main water pipes 34 and 36 are also provided with spare connections 80 and 82 to be connected to other toilet fixtures or sinks and washing machines, etc.

The various drains and vents are also positioned and supported either within or by the cage and illustrated in Figs. 8, 9 and 10.

Thus, a pair of traps 84 and 86 (Figs. 6, 7, 8, 9 and 10) are provided at each side of the unit beneath the floor level and these traps have inlets 88 and 90 to be connected to the tubs. Waste branches 92 and 94 are connected to the outlet side of the traps. Similarly traps 96 and 98 are arranged in the cage at slightly higher levels having connections 100 and 102 on their inlet sides to be connected to the basins 18. These traps are connected by suitable piping 104 and 106 to waste branches 92 and 94. These waste branches 92 and 94 have side outlets 151, 152 and 116. The outlets 151 and 152, by suitable pipings 153 and 154, are to be connected to the floor drains 138. The outlets 116 are spare connections, closed by plugs 118, to which may be connected other toilet fixtures, sinks, washing machines, etc., on the same floor level. The waste branches 92 and 94 are in turn connected to soil piping 108 and 110 which are brought together into a soil branch by means of a connection 112 having a threaded end 114. This end is to be joined, by means of a suitable connection to the soil stack. This connection can be a threaded, caulked or flanged joint depending upon the type of plumbing used in the building and also depending upon local plumbing code requirements.

Suitable vents are connected to the drainage pipes. The two toilet vents 124 and 126 are brought together within the cage by a fitting 144 and form one vent pipe 128. The two other vent pipes 120 and 122 are connected to the tub and basin drainage pipes. All three vent pipes 128, 120 and 122 extend upwards to the height of the cage where they end with union joints 156, 157 and 158. These three union joints 156, 157 and 158 connect the vent pipes 128, 120 and 122 with three vent pipes 153, 154 and 155 which come down from the vent branches. Lengths of these three pipes 153, 154 and 155 are to be cut according to the height of the room. Pipe 153 has spare connections 159 for auxiliary vent pipes from other toilet fixtures, sinks, washing machines, etc.

As shown, the pipe 153 ends with a cross-connecting fitting 130. The pipes 154 and 155 are likewise connected to the fitting 130 by means of vent branches 132 and 134. The fitting 130 is provided with a union joint 136 which connects the vent branches to the vent stack.

The vent branches are so constructed that, should two units be placed on different floors one above the other, the vent branches of the lower unit do not clash with the pipes or cage of the upper unit but pass by to the side and between the soil pipes of the upper unit, as shown on the perspective drawing, Fig. 3, in solid line 142 or in dotted line 142. The manner in which the vent branches pass by the soil pipes of the unit of an upper floor are shown also on the drawing of general view Fig. 9—the upper unit being shown in dotted line.

In the case where the soil branch of Fig. 3 does not face in the direction shown in solid line 140 on the drawing, but faces in the direction shown in dotted line 140, a slight change in the system of vent branches is necessary. Such variation of vent branches is shown in dotted lines in the upper portion of the drawing of Fig. 3.

The specific arrangement, size and detailed location of the various plumbing connections, piping and fittings heretofore described may, of course, be carried but all of these parts are supported in or by the metal cage formed by the members 20, 22 and 24 and are assembled at the factory or plant and the cage or unit is shipped ready for connections to the tubs, toilet bowls, basins and floor drains and to the joists and pipes of the building.

The various water supply pipes, drainage pipes and vent pipes may be mounted or secured in or to the cage in any suitable manner, such as by brackets, clamps or the like, and a detailed disclosure of such features has not been incorporated in the application. The provision of such unit, with or without the walls or facings 26 attached, and with the inlets or outlets to which the plumbing fixtures are to be attached, conveniently located near the outer sides or faces of the walls, reduces the plumbing to be done at the point of installation to a minimum.

The external walls can be equipped with all the necessary accessories, such as toilet paper holders, soap holders, glass and tooth brush holders, outlet plugs, etc. and the necessary electric wiring from such outlet plugs may also be built into the frame or cage. The unit so fabricated is then placed in an opening in the floor and connected to the joists. The soil branch is connected to the soil stack by a suitable joint. The three union joints of the vent branch, the cold water pipe and the hot water pipe are screwed together to their respective vent stack, cold and hot water house pipes and the fixtures are attached to their respective places on the cage.

As bathrooms are of varying heights, the unit will be of a lesser height than any bathroom and the upper part of the partition above the cage or unit can be completed by ordinary building methods.

I claim:

1. A prefabricated bath room unit comprising a frame having a central portion and side portions extending outwardly from the central portion in opposite directions, the central portion being substantially thicker than the side portions and the side portions being out of alignment with the another, a pair of flush tanks in the central portion, connections extending from the respective flush tanks to opposite sides of the central portion for connection with toilet bowls on opposite sides of said central portion, pipes in each of said side sections having connections extending to opposite sides thereof for connection to toilet basins and bath tubs, respectively, at opposite sides of said side sections, other pipes connected to said flush tanks and the pipes having connections for the toilet basins and bath tubs adapted to be connected to a source of water supply, a soil pipe in said central section, and connections extending from said soil pipe for connection to bath tubs, toilet basins and toilet bowls at opposite sides of said unit.

2. A prefabricated bath room unit as defined in claim 1 in which one side portion extends from one side of one end of the central portion and the other side portion extends from the other side of the other end of the central portion.

BORIS A. KRENOV.

References Cited in the file of this patent

UNITED STATES PATENTS

| Number | Name | Date |
|---|---|---|
| 839,996 | Holmes | Jan. 1, 1907 |
| 1,077,198 | James | Oct. 28, 1913 |
| 2,339,778 | Groeniger | Jan. 25, 1944 |
| 2,419,319 | Lankton | Apr. 22, 1947 |

FOREIGN PATENTS

| Number | Country | Date |
|---|---|---|
| 426,412 | Great Britain | Apr. 3, 1935 |